J. H. LIDHOLM.
METHOD OF TRANSFORMING CYANAMIDE INTO UREA.
APPLICATION FILED FEB. 28, 1922.
1,436,180. Patented Nov. 21, 1922.
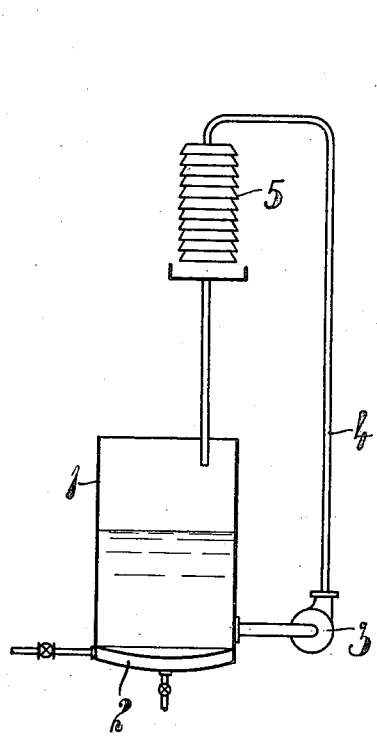
Fig. 1.
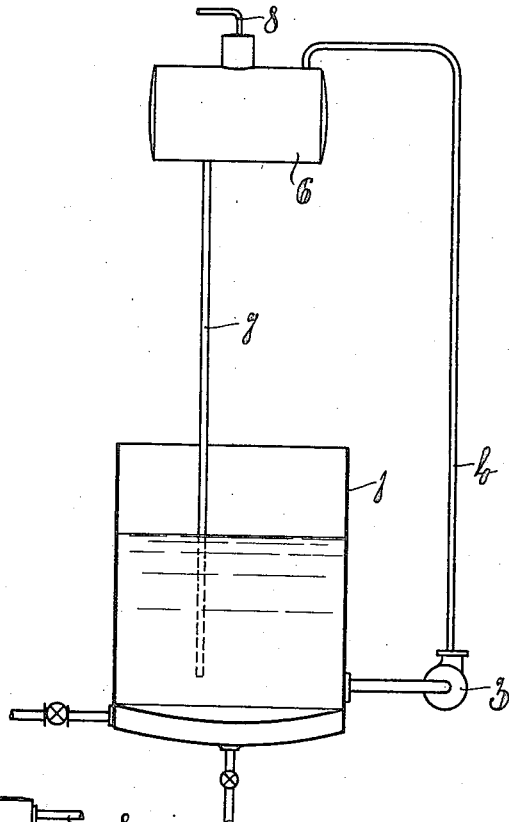
Fig. 2.
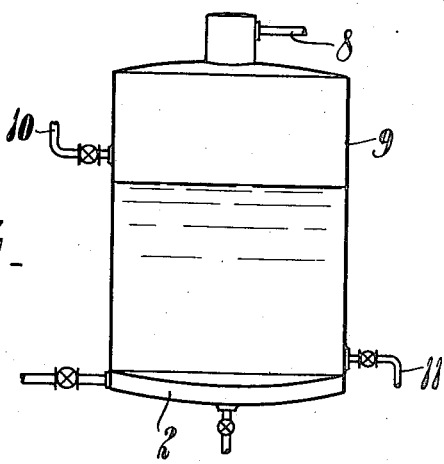
Fig. 3.
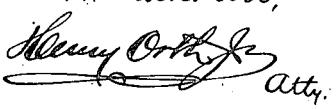
Inventor.
Johan H. Lidholm,
By Henry Orth Jr.
Atty.

Patented Nov. 21, 1922.

1,436,180

UNITED STATES PATENT OFFICE.

JOHAN HJALMAR LIDHOLM, OF WARGON, SWEDEN.

METHOD OF TRANSFORMING CYANAMIDE INTO UREA.

Application filed February 28, 1922. Serial No. 540,050.

*To all whom it may concern:*

Be it known that I, JOHAN HJALMAR LIDHOLM, a citizen of the Kingdom of Sweden, residing at Wargon, Sweden, have invented new and useful Methods of Transforming Cyanamide into Urea, of which the following is a specification.

This invention relates to a method of converting cyanamide into urea by means of a mineral acid.

When cyanamide is treated with sulphuric acid or other strong acids, it is known that urea is formed in such a way that the cyanamide adds water according to the formula:

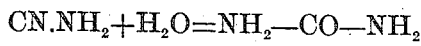

Simultaneously with this main reaction also other reactions take place. On the one hand part of the urea formed is transformed into carbon dioxide and ammonia according to the formula:

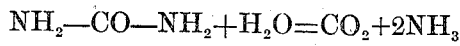

and on the other hand part of the cyanamide is converted directly into ammonia and other basic compounds.

The formation of these bases is a drawback to the manufacture of urea, partly thereby that they neutralize part of the sulphuric acid, causing the concentration of the acid to sink, and partly thereby that the end-product, urea, is turned into salts of ammonia and other bases as impurities.

Because of the fact that the above-mentioned reactions run with different velocities at different temperatures, it is, in order to achieve a good result, necessary to work at a temperature, at which the conversion from cyanamide to urea has a relatively high velocity, whilst the non-desirable by-reactions run relatively slowly. 65° centigrade is for instance such a temperature. When carried out on a commercial scale it is, however, difficult to maintain the proper temperature in the reaction mixture. Rather large quantities of heat are namely liberated when cyanamide is converted into urea, causing a more intense heating of the reaction mixture the stronger the solutions are. As at the start, the reaction runs with a large velocity it is practically impossible, especially when more concentrated solutions are used, by cooling-coils or other means for indirect cooling to remove the liberated reaction heat sufficiently quickly. Therefore the temperature rises so high that a considerable portion of the urea reacts with the sulphuric acid and forms sulphate of ammonia.

This invention refers to a method of maintaining a practically constant reaction temperature in the conversion of cyanamide to urea in the presence of a mineral acid and simultaneously utilizing the reaction heat. The invention consists chiefly therein that the reaction heat is used to evaporate a portion of the water of the solution.

In the accompanying drawing I have shown diagrammatically in Figs. 1 to 3 three embodiments of apparatus for carrying my invention into practice.

Referring to Fig. 1 of the drawing, 1 is an open container having a steam jacket 2 at the bottom or other equivalent means for heating the content of the container. 3 is a pump for circulating the content of the container through the pipe 4 up to a cooling tower 5 from which it again flows down into the container 1.

In carrying out the process in the apparatus described the cyanamide solution is introduced into the container 1 and sulphuric acid is added in such quantity that the solution becomes about 1-normal with respect to the acid. The solution is then heated by supplying steam to the jacket 2 of the container so that the temperature will rise to about 65° C. When the reaction has started and the temperature begins to rise the solution is continuously pumped up to the cooling tower where a part of the water of the solution is evaporated and carried away by the atmospheric air said evaporation causing a cooling of the solution which then flows back to the container. In this manner the reaction temperature may be kept practically constant during the operation and the heat evolved by the reaction utilized for a partial concentration of the solution.

In Fig. 2 I have shown another embodiment of the apparatus for carrying out the process. 1 is an open container as in Fig. 1 and 6 is a boiler which is placed somewhat less than 10 metres above the container 1 and is connected with the latter by means of a pipe 7 which reaches nearly to its bottom. 3 is a pump for circulating the solution from the container 1 through the pipe 4 up to the boiler 6. 8 is a pipe leading to a condenser and vacuum pump (not shown) by means of which such high vacuum is maintained in the boiler that the solution contained therein will boil at a temperature of for instance 45° C.

In carrying out the process in the apparatus shown in Fig. 2 the cyanamide solution is introduced in the container 1 and sulphuric acid is added as before. The solution is then heated by means of the steam jacket and when the reaction has started and the temperature rises the pump 3 is started so that the solution is continuously circulated through the boiler 6 wherein a part of the water of the solution is evaporated on account of the high vacuum in said boiler whereby the solution is cooled down to about 45° C. The solution flows then down through the pipe 7 to the container 1 wherein it causes the desired cooling effect on the solution contained therein.

I can also perform the reaction in a closed boiler, in which a suitable vacuum is maintained by means of a vacuum pump and a condenser so that the solution contained therein is brought to boil as soon as the desired reaction temperature is reached and the temperature thus is prevented from becoming too high. In Fig. 3 I have shown an embodiment of such apparatus. 9 is the boiler having inlet 10 and outlet 11 for the solution and a steam jacket 2 at the bottom for heating the solution to reaction temperature. 8 is a pipe leading to a condenser and vacuum pump (not shown) by means of which such high vacuum is maintained in the boiler that the solution contained therein boils at a temperature of about 65° C. The operation of said apparatus will be evident from the above description without further explanation.

By the use of this method for cooling the reaction mixture it is possible to lead the reaction in such a favourable way that non-desirable by-reactions take place only to a very small degree and that the reaction heat is made useful for the concentration of the solution.

When working with solutions, which contain about 15% cyanamide and are about 1-normal with respect to sulphuric acid, the reaction heat is sufficient to evaporate about 20% of the original quantity of water, and the reaction has come practically to an end in the course of 5 hours.

Towards the end of the reaction, when most of the cyanamide has been converted the liberation of heat is small. Generally it is therefore necessary to supply heat from outside during the last period of reaction in order to maintain the desired reaction temperature.

What I claim is:—

1. Method of converting cyanamide into urea, comprising acting upon a solution of cyanamide by a mineral acid, and utilizing the heat liberated by the reaction for partially evaporating the solvent.

2. Method of converting cyanamide into urea, comprising acting upon a solution of cyanamide by a mineral acid at a pressure below the atmospheric pressure, and removing the heat liberated by the reaction by partially evaporating the solvent by means of said heat.

In testimony whereof I have signed my name.

JOHAN HJALMAR LIDHOLM.